Feb. 14, 1956 R. F. MASSON 2,734,299
INSTRUMENT FOR ATTACHING FISHHOOKS TO LEADERS
Filed Jan. 9, 1953
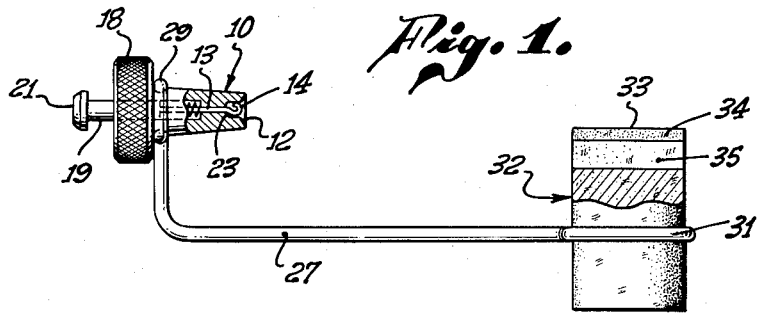
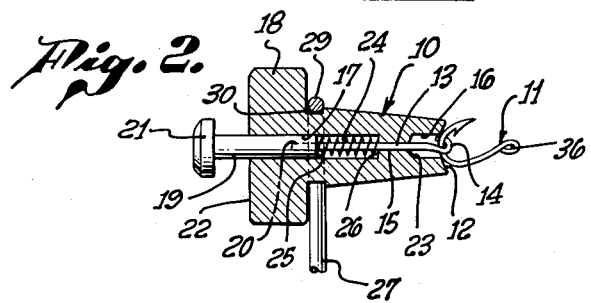
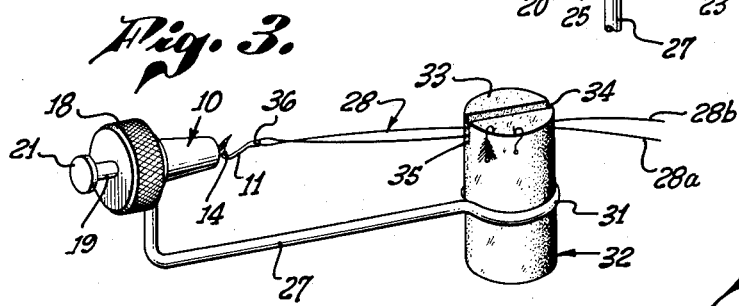
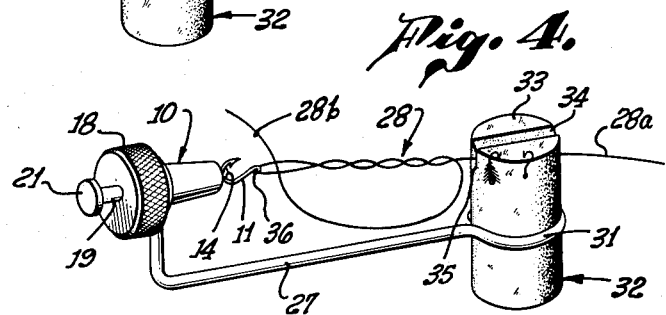
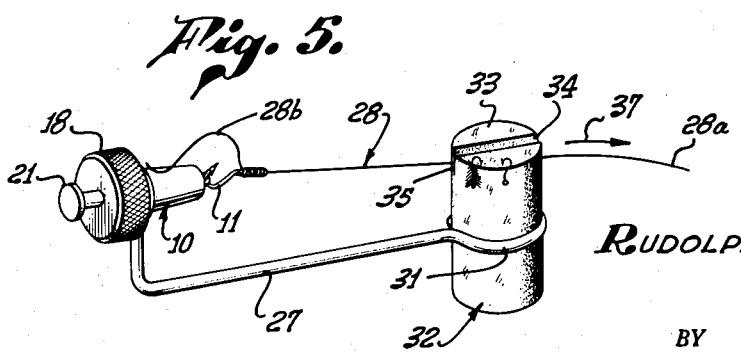
RUDOLPH F. MASSON, INVENTOR
BY John Flam
ATTORNEY.

United States Patent Office 2,734,299
Patented Feb. 14, 1956

2,734,299

INSTRUMENT FOR ATTACHING FISHHOOKS TO LEADERS

Rudolph F. Masson, Burbank, Calif.

Application January 9, 1953, Serial No. 330,487

2 Claims. (Cl. 43—1)

This invention relates to a device for attaching fish hooks to leaders.

One of the more tedious types of operations often required by a fisherman is that of properly securing a leader to a hook, especially when the hook is of a small size. Not only is it a difficult task to hold and manipulate the hook and leader properly to tie the latter to the former, but there is an ever present danger in connection with the barb of the hook.

It is, accordingly, an object of this invention to overcome these disadvantages, particularly by providing a device operable in a simple manner to hold the hook securely, and render readily accessible the eye of the hook for the tying operation.

It is another object of this invention to provide a device of this character that mounts the hook for rotation about an axis substantially longitudinally of its shank portion, whereby the actual tying operations may be greatly facilitated.

It is still another object of this invention to provide a device of this character that also has provisions for properly guiding the end of the leader, all in relation to the hook held by the device, thereby facilitating the attachment of the leader to the hook.

It is still another object of this invention to provide a device of this character in which an extra supply of hooks may be safely and securely carried. To effect this purpose, the structure guiding the leader end is conveniently made of cork, those portions of the cork not used for guiding the leader forming a convenient holder for the hooks.

It is still another object of this invention to provide a device of this character that is extremely simple in structure, and that is compact.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is an elevation of a device incorporating the present invention, a part of the structure being shown in section;

Fig. 2 is an enlarged sectional view of that portion of the apparatus of Fig. 1 comprising the hook holder, the apparatus being illustrated in cooperative relationship with a fish hook; and Figs. 3, 4, and 5 are pictorial views, illustrating the steps used for tying a leader to a hook.

The hook holder has a main body portion 10 of frustoconical configuration that provides a seat against which the convex portion of a fish hook 11 is held. For this purpose, the seat proper is formed by an annular surface 12 (Fig. 2) at the small end of the conical body 10. This annular surface 12 is generally of concave configuration providing a seat.

An elongate hook grasping member 13 is adapted to project through the annular seat 12 from within the body 10 to engage the fish hook 11, and, after such engagement, it is retracted to urge the convex side of fish hook 11 firmly into engagement with the concave seat 12. For grasping the fish hook 11, the member 13 has a hook-shaped end 14 in which is received the corresponding curved portion of the fish hook 11. The hook-shaped end 14 and the fish hook 11 thus form opposed inter-engaging hooks.

The member 13 is guided for longitudinal movement in a direction axially of the annular seat 12. For this purpose, the body 10 has an apertured guiding flange 15 extending radially inwardly of a through axial bore 16, 17. One end 16 of the bore opens centrally of the seat 12. The other end 17 opens at the opposite end of the holder, the bore 17 also extending through an end flange 18 integrally formed with the conical body 10. An operator or plunger 19 is partially and guidingly received in the bore 17, and is secured to the grasping member 13 for manipulating the latter.

The operator 19 is secured to the hook grasping member 13 by force fitting the end of the hook grasping member 13 into an opening recess 20 of the operator 19.

An enlarged button 21 is integrally formed at the end of the operator 19 to facilitate manipulation of the operator 19. Movement of the operator 19 toward the right with respect to the body 10 is limited by engagement of the button 21 with that portion of the end surface 22 of the body 10 adjacent the exterior opening of the bore 17. Movement of the hook grasping member 13 toward the left, when no fish hook is present, is limited by engagement of the hook end 14 with a tapered shoulder 23 formed by the flange 15 (Fig. 1). The distance between the enlarged head 21 and the hook end 14 is substantially in excess of that between the surface 22 and the shoulder 23. Accordingly, the operator 19 and hook grasping member 13 are together longitudinally movable between defined limits in the body 10.

Movement of the operator 19 and hook grasping member 13 toward the right with respect to the body 10, as viewed in Fig. 1, locates the hook end 14 substantially beyond the annular seat 12. In such position, the hook end 14 is exposed, and the fish hook 11 may be selectively engaged by or disengaged from the hook end 14. Movement of the hook grasping member 13 and operator 19 toward the left when the fish hook is grasped then serves to move the hook 11 firmly into engagement with the annular seat 12.

In order that such seating relationship be normally maintained, a compression spring 24 is provided. This spring 24 is generally of helical form and surrounds the hook grasping member 13. It abuts at its respective ends the end surface 25 of the operator 19 and a shoulder 26 formed by the flange 15. Accordingly, the spring 24 urges the operator 19 and grasping member 13 toward the left with respect to the body 10, as viewed in Figs. 1 and 2. Engagement of the fish hook 11 with the concave seat 12 prevents the spring 24 from fully retracting the grasping member 13. However, when the hook end 14 is out of engagement with the fish hook 11, the spring fully retracts the mechanism to the position shown in Fig. 1, wherein the hook end 14 engages the shoulder 23. The spring 24 offers only slight resistance against movement of the member 13 toward the right.

The holder body 10 is mounted upon a wire frame 27 for rotation about its longitudinal axis. The frame 27 forms the means whereby the device can be held by the user. Rotation of the holder causes intertwining of a doubled link of leader 28, in a manner to be described more fully hereinafter.

For this purpose, one end 29 of the frame 27 is bent or otherwise formed to a circular loop configuration, the end of the loop being free. The holder body 10, as shown most clearly in Fig. 2, has an annular groove 30 that accommodates the loop 29. The groove 30 is formed between the conical body portion 10 of the holder and the enlarged annular flange 18.

The conical configuration of the holder facilitates the assembly of the holder with the frame 27. Thus, in assembly, the conical end of the holder body 10 is inserted through the loop 29, the proportions of the body 10 and loop 29 being such as to permit initial free passage of the body 10. Upon continued movement into assembled relationship, the conical surface of the body 10 engages the loop 29 and causes the loop 29 to expand until it is ultimately to be snapped into the groove 30.

The other end 31 of the frame 27 is of loop configuration to accommodate a leader holder 32. This holder 32 may be made of cork or of other suitable resilient material. At least a portion of the periphery of the holder 32 is normally of a diameter slightly exceeding that of the internal diameter of the end loop 31. The resilient characteristics of the cork 32 are thus utilized to maintain it in proper assembled relationship with the frame 27.

The upper end surface 33 of the cork 32 has a V-notch 34. A slit 35 extends in a plane axially of the cork 32 and connects with the bottom of the notch 34. The leader 28 is adapted to be grasped by the cork member 32 upon positioning the leader 28 between opposite walls of the slit 35 by urging the leader 28 downwardly in notch 34. Such positioning is facilitated by the notch 34, which acts as a guide to the slit 35.

The frame 27 has a right angle bend intermediate its length so that the axes of the loops 29 and 31 are disposed at right angles to each other. The cork 32 may be positioned substantially to align the V-notch with the axis of the hook holder loop 29. The cork 32 may conveniently form a holder for extra hooks, the barbs being lodged in the body of the cork 32.

Figs. 3, 4, and 5 illustrate a manner in which the device may be used for securing a leader end to the fish hook 11.

Fig. 3 illustrates the doubled length of leader 28 passed through the eye 36 of the fish hook 11, the fish hook 11 being held against the seat 12, substantially as in Fig. 2. The two strands 28a and 28b of the leader are held substantially taut by the walls of the slit 35 of the cork 32. The leader strands extend substantially axially of the holder body 10 by virtue of the particular configuration of the frame 27. Rotation of the holder by the aid of the annular flange 18, which is peripherally knurled, thus causes the hook 11 to be rotated and to intertwine that portion of the doubled length of leader between the hook eye 36 and the slit 35.

In Fig. 4, the strands 28a and 28b of the leader 28 have been intertwined. One of the strands 28b of the leader is then dislodged from the slit 35. The end of this strand 28b is then passed through that loop of the leader adjacent the fish hook 11 that is formed by the intertwined strands. The other strand 28a is then pulled in the direction of the arrow 37, illustrated in Fig. 5. Such movement of the strand 28a tightens the intertwined portion and forms an appropriate tied end with respect to the hook eye 36. The strand 28b can then be trimmed, as by cutting. An appropriate knotted connection is thus readily formed between the hook 11 and the leader 28.

The hook 11 is then removable from the holder by manipulation of the button 21 to make it possible to free the hook 11 from the grasping member 13.

The inventor claims:

1. In apparatus for facilitating tying of leaders upon fish hooks: a body having an exterior conical portion at one end converging in a direction toward said one end, said body having a peripheral annular groove formed therein intermediate its length adjoining said conical portion, a releasable hook gripper member carried by the body and located substantially at the axis of said groove; and a wire frame having a loop at one end received in said annular groove for rotatably mounting said body.

2. In a device of the character described: a wire frame having a first loop at one end, and a second loop at the other end; a releasable hook gripping structure having an annular groove formed in the outer surface thereof, said groove receiving said first loop for rotatably mounting said hook gripping structure; said frame having a bend intermediate its length so that the axes of the respective loops extend substantially at right angles with repect to each other; and a resilient leader holder having an exterior surface, a portion of which is substantially cylindrical and in wedging relationship with said second loop, said holder having a slit extending in a plane substantially axially of the cylindrical portion, said plane being substantially aligned with the axis of the first loop.

References Cited in the file of this patent

UNITED STATES PATENTS

| | | |
|---|---|---|
| 575,674 | Woodward | Jan. 19, 1897 |
| 1,522,373 | Knight | Jan. 6, 1925 |
| 2,236,781 | Pannier | Apr. 1, 1941 |
| 2,281,180 | Christ | Apr. 28, 1942 |
| 2,550,130 | Whaley | Apr. 24, 1951 |
| 2,570,575 | Lindbloom | Oct. 9, 1951 |
| 2,601,605 | Fulvio | June 24, 1952 |
| 2,645,832 | Lee | July 21, 1953 |

FOREIGN PATENTS

| | | |
|---|---|---|
| 100,502 | Great Britain | June 1, 1916 |
| 122,999 | Sweden | Aug. 12, 1948 |